US008770402B2

(12) United States Patent  
Bergreen et al.

(10) Patent No.: US 8,770,402 B2
(45) Date of Patent: Jul. 8, 2014

(54) WATERPROOF PROTECTIVE CASE FOR A MOBILE DEVICE

(75) Inventors: Brooks Bergreen, Burnaby (CA); David Keddie Brown, Vancouver (CA)

(73) Assignee: Iceberg Commerce Inc., Vancouver (CA)

( * ) Notice: Subject to any disclaimer, the term of this patent is extended or adjusted under 35 U.S.C. 154(b) by 77 days.

(21) Appl. No.: 13/359,373

(22) Filed: Jan. 26, 2012

(65) Prior Publication Data

US 2013/0193006 A1 Aug. 1, 2013

(51) Int. Cl.
*B65D 85/00* (2006.01)

(52) U.S. Cl.
USPC .............. 206/320; 206/811; 206/37; 206/305

(58) Field of Classification Search
USPC ............. 220/378; 361/679.3, 679.56, 679.55, 361/679.26, 679.01; 206/320, 305, 37, 811
See application file for complete search history.

(56) References Cited

U.S. PATENT DOCUMENTS

| 5,265,720 A * | 11/1993 | Meliconi ........................ 206/305 |
| 7,594,576 B2 * | 9/2009 | Chen et al. .................... 206/320 |
| 7,967,298 B2 * | 6/2011 | Hurlbert et al. ............... 277/567 |
| 2009/0080153 A1 * | 3/2009 | Richardson et al. ..... 361/679.56 |
| 2012/0018325 A1 * | 1/2012 | Kim .............................. 206/320 |

* cited by examiner

*Primary Examiner* — Andrew Perreault
(74) *Attorney, Agent, or Firm* — Carr & Ferrell LLP (57) ABSTRACT

A protective case for a mobile device is provided, which includes a backing and a sidewall section, where the sidewall section has four sides and is coupled to the backing such that a cavity is formed when the backing and the sidewall section are attached. The protective case also includes a geometry seal located inside of the cavity, where the geometry seal is configured to form a lower waterproof seal with the sidewall section and the backing. Furthermore, the protective case also includes a top section, which forms an upper waterproof seal with the sidewall section and the geometry seal, thereby allowing the protective case to provide a waterproof seal around the mobile device.

20 Claims, 8 Drawing Sheets

WATERPROOF PROTECTIVE CASE FOR A MOBILE DEVICE

BACKGROUND

Field of the Invention

The present invention relates generally to protective cases for mobile devices, and more particularly to protective cases that are waterproof.

SUMMARY

A protective case for a mobile device is provided, which may advantageously be waterproof while maintaining a relatively compact and lightweight profile. The protective case includes a backing and a sidewall section, where the sidewall section has four sides and is coupled to the backing such that a cavity is formed when the backing and the sidewall section are attached. The protective case also includes a geometry seal located inside of the cavity, where the geometry seal is configured to form a lower waterproof seal with the sidewall section and the backing. Furthermore, the protective case also includes a top section, which forms an upper waterproof seal with the sidewall section and the geometry seal, thereby allowing the protective case to provide a waterproof seal around the mobile device. The top section, in some embodiments, may also include a transparent cover configured to permit access to a touch screen of the mobile device.

DETAILED DESCRIPTION

A waterproof protective case for a mobile device may be used to provide protection from shock and water damage to mobile devices. These mobile devices often include sensors, touch-sensitive screens, and other electronic components that are sensitive to damage from their environment. Often this damage takes the form of impact from dropping the mobile device, or damage from foreign substances, such as dust or dirt, or liquids. The protective case includes a backing, a sidewall section comprising four sides, and a geometry seal located inside of a cavity formed by the backing and the sidewall section. The mobile device may be placed inside of the cavity, and the geometry seal forms a lower waterproof seal with the sidewall section and the backing, and an upper waterproof seal with the sidewall section and a top section. The lower waterproof seal and the upper waterproof seal cause the cavity to be waterproof, thereby protecting the mobile device from liquid. Also, the top section includes a transparent cover that permits access to a touch screen of the mobile device.

By having the transparent cover on the top section of the protective case, a user may advantageously access the touch screen of the mobile device while the mobile device is waterproof, and thereby have access to the full functionality of the mobile device. Also, the geometry seal may include, in exemplary embodiments, one or more protrusions into the cavity, thereby providing shock protection as well as waterproofing for the mobile device without compromising functionality. In further embodiments, access to buttons and a headphone jack of the mobile device may also be provided while preserving the liquid-resistant and optionally shock-resistant properties of the protective case.

Figure 1:
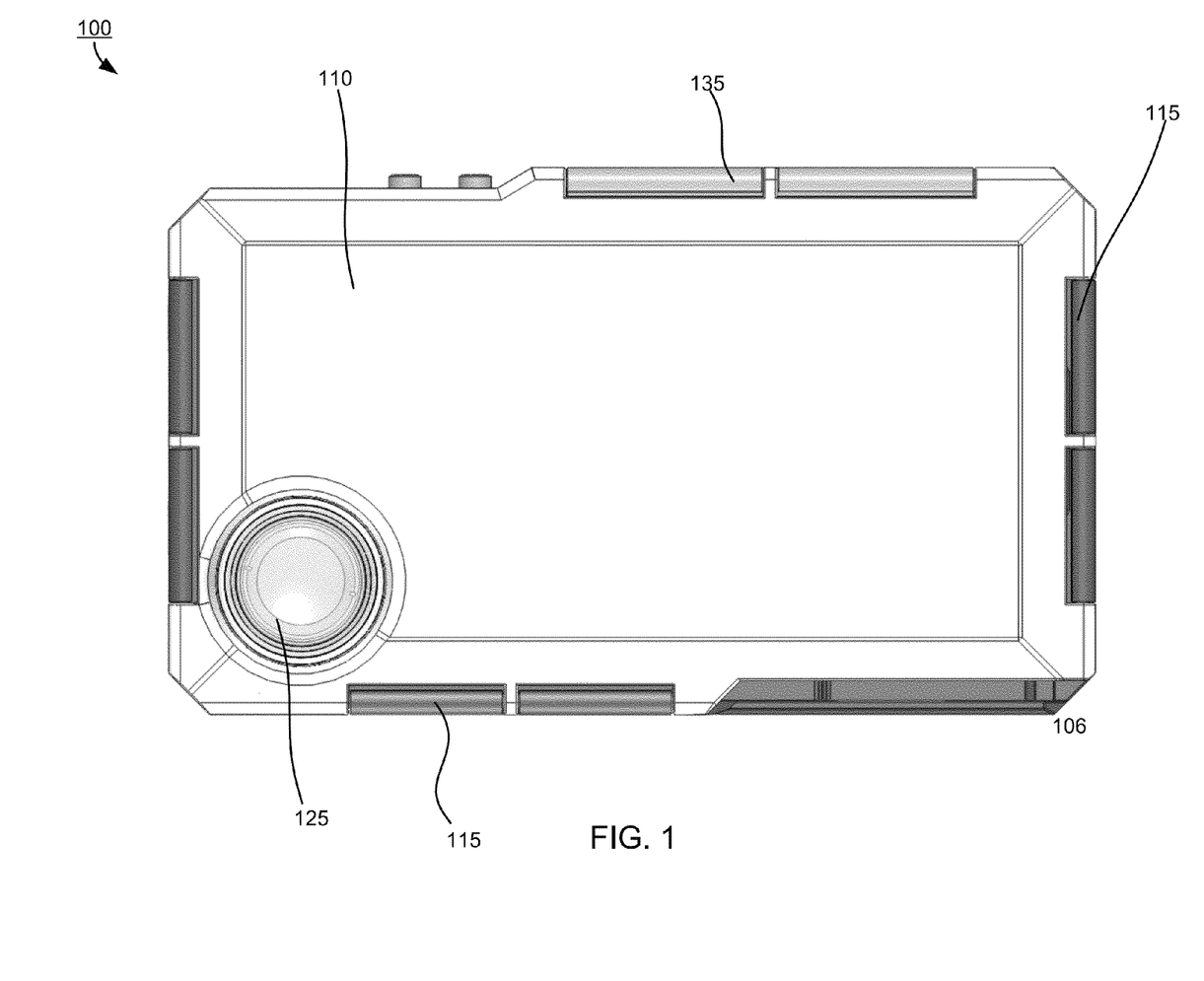
FIG. 1 displays a bottom view of an exemplary protective case for a mobile device.

FIG. 1 displays a bottom view of an exemplary protective case 100 for a mobile device. In the illustrated embodiment, the backing 110 of the protective case 100 is shown, as are latches 115 and camera lens cover 125.

The protective case 100 may be of any appropriate size to fit the mobile device. The protective case 100 may also be composed of any suitable material and/or combination of materials, such as plastic, metal, rubber, etc. In some embodiments, the protective case 100 may be designed to float on water, which may be advantageous to further reduce exposure of the case to liquid and thereby increase the useful life of the protective case 100.

As stated above, the protective case 100 is used to protect a mobile device. A mobile device may be any portable electronic device having a display. Examples of mobile devices that may be used with embodiments of the protective case 100 may include but are not limited to portable computers, portable game consoles, portable music players, tablets, iPods®, iPhones®, Smartphones, portable navigation systems, other similar devices. A Smartphone may be generally defined as a phone with computing capability. A Smartphone may provide Internet access to an end user.

The backing 110 may be coupled to a sidewall section using two or more latches 115 and at least one hinge 135. Three latches are shown in the illustrative embodiment shown in FIG. 1; however, more or fewer latches may be used depending on a user's preference. The two or more latches 115 may be any suitable latch design that permits or allows for the two or more latches 115 to be in an open position, where the backing may be decoupled from the sidewall section, and a closed position, where the position of the backing is fixed with respect to the sidewall section. The two or more latches 115, when closed, hold the backing 110, the sidewall section, and a top section (shown in FIG. 2) together to encase the mobile device in a waterproof chamber.

The at least one hinge 135 may be any suitable hinge allowing the protective case 100 to alternate between open and closed positions. The at least one hinge 135 may be a barrel hinge, a case hinge, or any other hinge type that allows for at least two positions (e.g., an open and a closed position). When in an open position, a user may place the mobile device inside of the sidewall section and with the back of the mobile device resting upon an inner surface of the backing.

Figure 4:
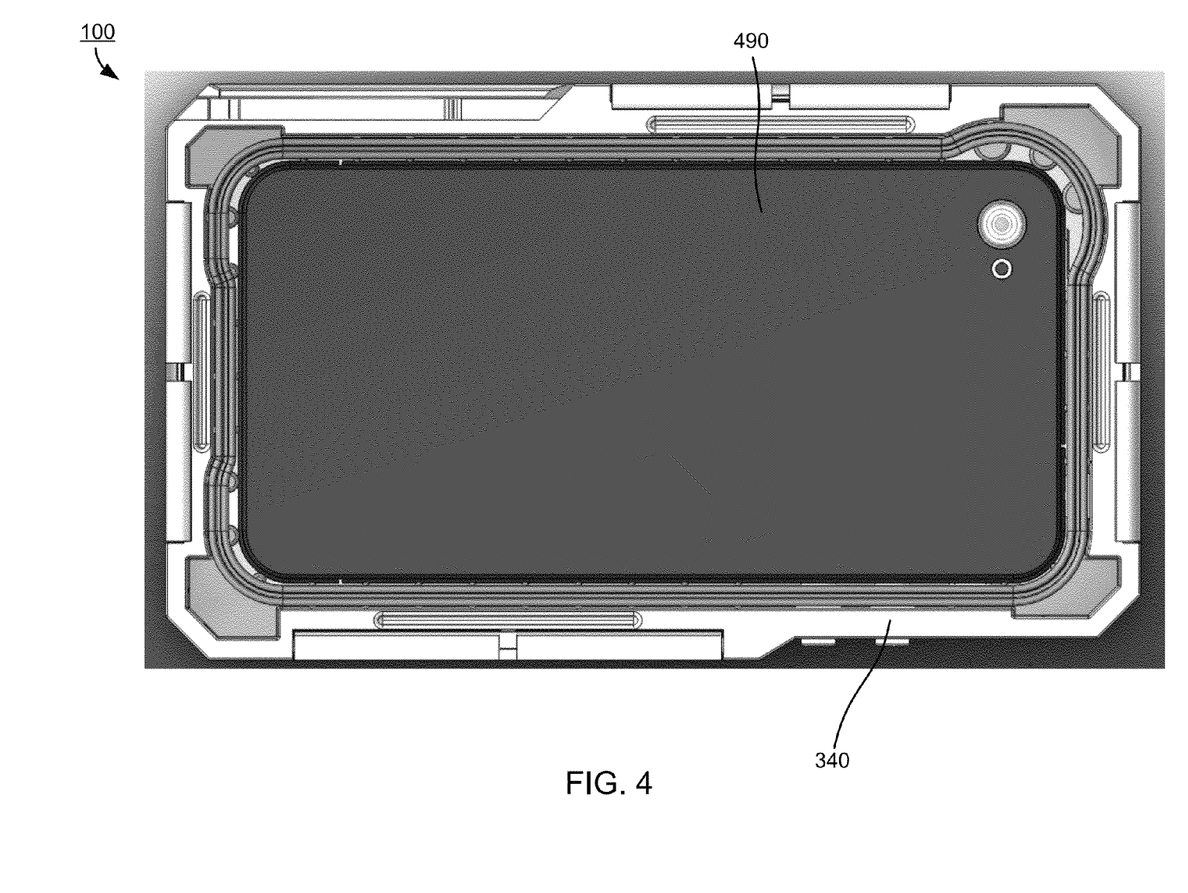
FIG. 4 displays a cut-away bottom view of an exemplary protective case for a mobile device.

FIG. 4 displays a cutaway bottom view of an exemplary protective case 100 for a mobile device 490. When the at least one hinge 135 is open, the mobile device 490 may be inserted into the cavity formed by the sidewall section 340 and the backing 110. The hinge 135 may then be closed, thereby securing the mobile device 490 inside of a waterproof chamber provided by the protective case 100. While a clamshell design is utilized in the exemplary embodiment, other hinge designs may be used, such as a sliding hinge or other suitable hinge. Also, the hinge 135 may, in exemplary embodiments, permit the protective case 100 to be opened by having the top section open (and having the mobile device 490 inserted into the protective case 100 face up), in addition or in alternative to the exemplary embodiment shown in FIG. 4 (where the mobile device 490 would be inserted into the protective case 100 face down).

While hinges and latches are shown in the exemplary embodiments of FIGS. 1 and 4, the protective case may be secured using other technologies, and the present invention is not limited in this regard. For example, a pressure fit system or interference fit may be used, where friction between the top section and/or backing and the sidewall is used to hold the protective case in a closed position (e.g., using tabs that snap together to engage and which may be disengaged by pulling the tabs apart).

Returning to FIG. 1, in certain embodiments, the mobile device may have a camera, whose lens is located on the back of the mobile device. Such designs may be common for SmartPhones and digital cameras, for example. To support such camera functionality while the mobile device is secured within the protective case, a camera lens cover 125 may be included on the backing. The camera lens cover 125 may be transparent to allow light to enter the lens of the mobile device.

In some embodiments, a rail mounting, including one or more rails and slots may be incorporated into the protective case as part of a rail mounting system. Provisional application No. 61/591,244, titled "Providing A Rail Mounting System For A Mobile Device Case" and filed concurrently herewith, is incorporated by reference.

Figure 2:
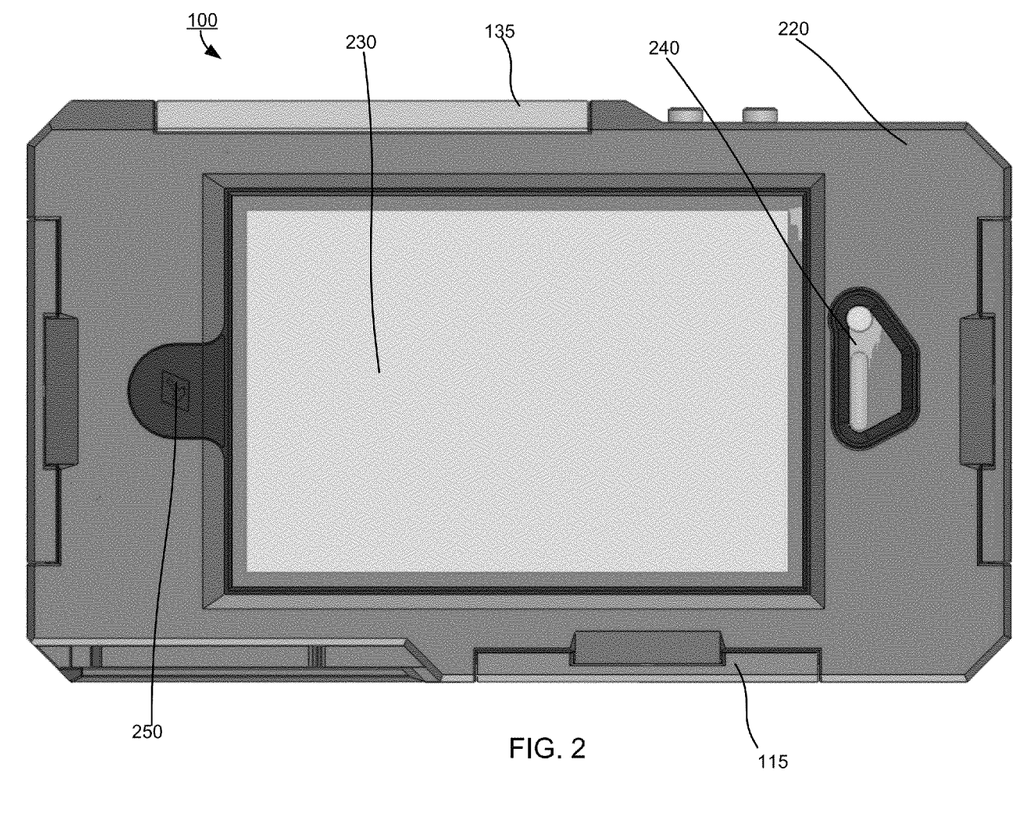
FIG. 2 displays a top view of an exemplary protective case for a mobile device.

FIG. 2 displays a top view of an exemplary protective case 100 for a mobile device 490. The illustrated embodiment shows a top section 220 of the protective case 100, which includes transparent cover 230, button cover 250, and front lens cover 240. The latches 115 and hinge 135 are also displayed.

The top section 220 may cover the top side of the mobile device, and includes a transparent cover 230. The transparent cover 230 is configured to permit access to a touch screen of the mobile device 490, thereby preserving the functionality of the mobile device while offering the protective benefits of the protective case 100. The transparent cover 230 may be composed of any suitable transparent material, and in an exemplary embodiment may be composed of polycarbonate plastic.

The top section 220 may be implemented in a number of ways. For example, the top section 220 may be integrated into the geometry seal, described below. Such a configuration may be advantageous because such integration may improve the waterproof quality of the protective case 100. Although having the top section 220 separate from the geometry seal may lead to loss of waterproofing (e.g., by temperature changes over time, by the force of impact, degeneration of any adhesive used, etc.), the top section 220 may also be a separate piece from the geometry seal. Similarly, the transparent cover 230 may be integrated into the top section in some embodiments, for similarly beneficial reasons. Alternatively, the transparent cover 230 may be implemented as a separate element affixed to the top section in some embodiments.

Figure 3:
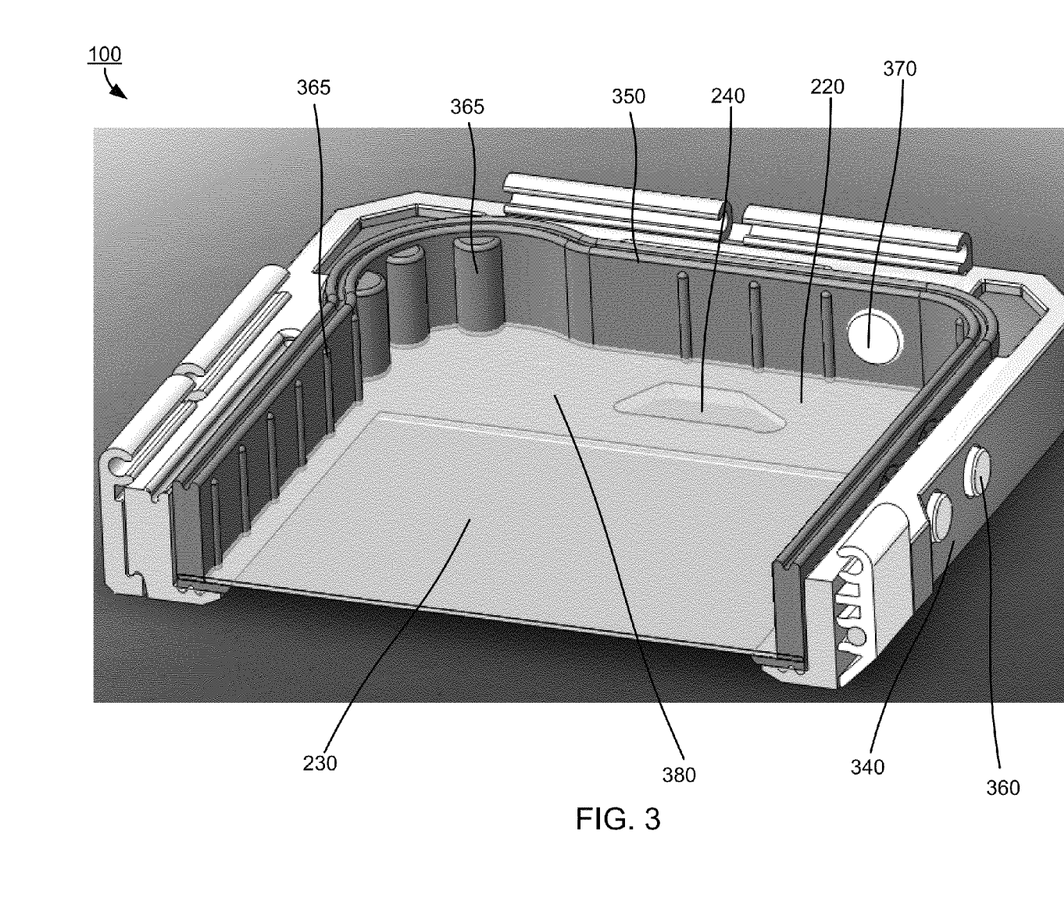
FIG. 3 displays a perspective cross-section view of an exemplary protective case for a mobile device.

FIG. 3 shows an implementation where the top section 220, the geometry seal 350, and the transparent cover 230 are implemented as a single waterproofing element. In addition to the waterproofing advantages described above, an additional benefit may be realized, as the single waterproofing element may simply be replaced when its useful life is complete, so the user is not required to purchase a new protective case. As another benefit, having a single waterproofing element allows the user to exchange the single waterproofing element for aesthetic reasons (e.g. to have a top section 220 and geometry seal 350 of different colors), or any other reason the user desires.

Returning to FIG. 2, as described above, the latches 115 may be used to secure the protective case 100 in a closed position, and may hold the top section in a substantially fixed position with respect to the sidewall section and the backing.

Front lens cover 240 may be implemented in some embodiments. The front lens cover 240 may be configured to allow light to enter a front lens of a second camera of the mobile device located on the top side of the mobile device. As shown, the front lens cover 240 may be similarly designed and have similar functionality as the lens cover 125, although, as shown, the shape of the front lens cover 240 may be different from the shape of the lens cover 125.

The button cover 250 may, in exemplary embodiments, be formed separately from the top section 220 to permit a user to access a button on the top side of the mobile device. In an exemplary embodiment, the button cover 250 may be constructed of a waterproof material, such as rubber or plastic, and attached to the top section 220 in such a way to not compromise the protection from liquid that the protective case 100 provides.

FIG. 3 displays a cut-away cross-section view of an exemplary protective case 100 for a mobile device. In the illustrated embodiment, the sidewall section 340 and a geometry seal 350 of the protective case 100 are shown. The sidewall section 340 includes button openings 360, protrusions 365, and headphone port opening 370. Top section 220, as well as front lens cover 240 and transparent cover 230, are also shown.

The sidewall section 340 may include four sides, as shown in the exemplary embodiment. In alternative embodiments, however, any suitable number of sides may be included (e.g., three sides, five sides, etc.), though a four-sided sidewall may be advantageous to avoid unnecessary bulk. The sidewall section may be coupled to the backing using the two or more latches 115 and the sidewall section being configured with the backing to form a cavity 380 when attached to the backing;

The geometry seal 350 is located inside of the cavity 380, and substantially waterproofs the cavity, thereby protecting the mobile device from damage from liquid. The geometry seal 350 may be any type of elastic or semielastic seal having two or more pressure points along its exterior, such as, for example, an H-seal or any other multi-ridge seal. While a single pressure point seal, such as an O-ring, may be used with the present invention, a geometry seal may be advantageous because having two or more pressure points may effectively increase the surface area of the seal. Having increased surface area may reduce the pressure needed to make a seal waterproof. As a result, using a geometry seal 350 can make the protective case 100 easier to open and close (because less force is needed to make a seal), lighter, and less rigid than a protective case that uses an O-ring or similar seal with a single pressure point.

Additionally, the geometry seal 350 may be composed of any suitable elastic or semi-elastic material capable of forming a substantially waterproof seal, including rubber and plastic. In an exemplary embodiment, the geometry seal 350 may be composed of a shock-absorptive material, such as rubber or foam. Since the mobile device 490 may be surrounded by and in contact with the geometry seal 350 while in the protective case 100, significant protection from external forces, such as impacts from being dropped, may be provided to the mobile device by the geometry seal 350.

Figure 5:
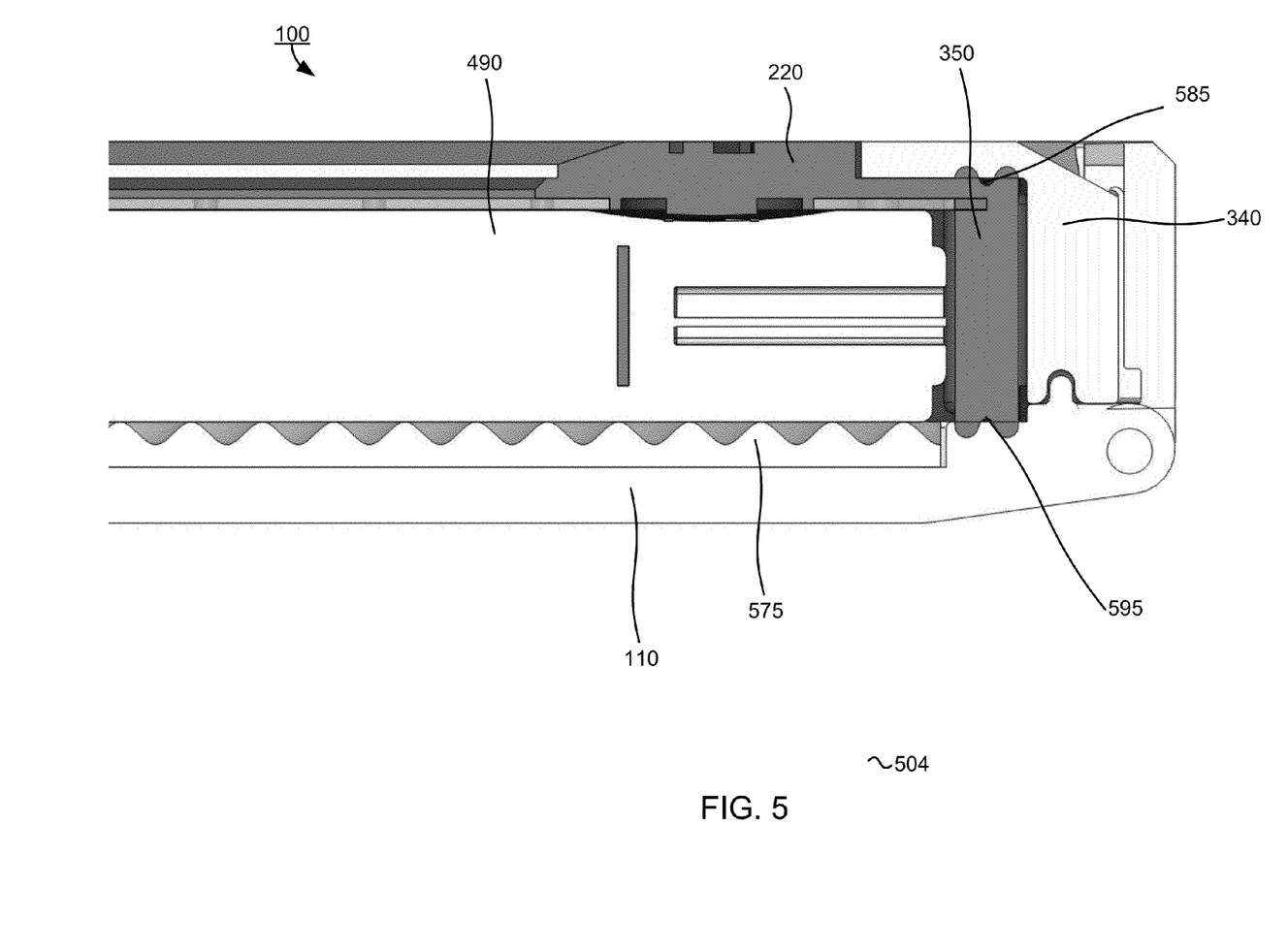
FIG. 5 displays a cut-away view of a cross-section of an exemplary protective case for a mobile device.

The operation of an embodiment of the geometry seal 350 is illustrated in FIG. 5. FIG. 5 displays a side view of a cross-section of an exemplary protective case 100 for a mobile device 490. The geometry seal 350 is configured to form a lower waterproof seal 595 with the sidewall section 340 and the backing 110. The geometry seal 350 is further configured to form an upper waterproof seal 585 with the sidewall section 340 and the top section 220. Having both the lower waterproof seal 595 and the upper waterproof seal 585 prevent water from entering the cavity 380 provides protection to the mobile device 490, even when the protective case 100 is completely submerged in water. In some exemplary embodiments, the protective case 100 is waterproof for greater than two meters depth under water.

Returning to FIG. 3, additional protection from external forces may be provided by the protective case 100. For example, as shown in the exemplary embodiment of FIG. 3, the geometry seal 350 may include one or more protrusions 365 into the cavity 380. The one or more protrusions 365 may provide shock protection for the mobile device 490, by holding the mobile device 490 in place and absorbing shock caused by force applied to the protective case 100. The one or more protrusions 365 may take any suitable shape, such as semicircles, triangles, cones, etc. An additional benefit of the one or more protrusions 365 is that the space in between the one or more protrusions 365 may make it easier for a user to insert and remove the mobile device 490 with respect to the protective case 100.

In addition to utilizing the transparent cover 230, some embodiments may further preserve functionality of the mobile device 490 by utilizing one or more button openings 360. The sidewall section 340 may include one or more button openings 360. The geometry seal 350 may be exposed through the button openings 360 such that one or more buttons on the mobile device 490 may be pressed through the one or more button openings 360 via contact with the geometry seal 350 through the button openings 360. By allowing access to the buttons on the mobile device 490 while the mobile device 490 is inside of the waterproof chamber provided by the protective case 100, the functionality of the mobile device 490 may be further preserved.

The protective case 100 may further comprise a headphone port opening 370, which passes through the geometry seal 350, in some embodiments. The headphone port opening 370 may allow a headphone plug to be inserted through an opening in the sidewall into the mobile device, allowing use of headphones while the mobile device 490 is inside of the protective case 100.

Figure 6:
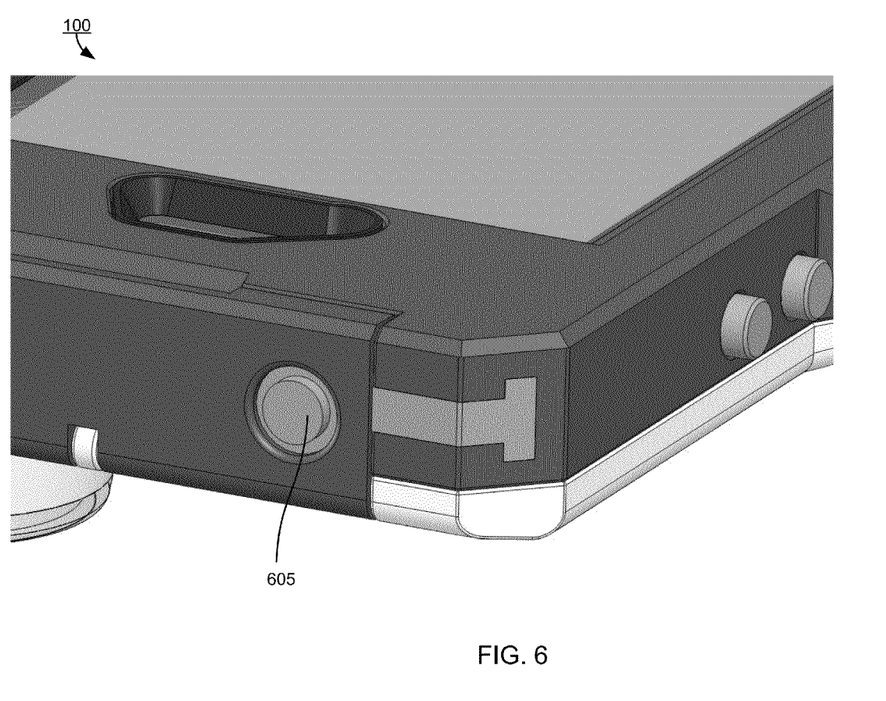
FIG. 6 displays a perspective view of a side of an exemplary protective case for a mobile device.

While the headphone port opening 370 may permit use of headphones, such an opening in the geometry seal 350 may compromise the waterproofing properties of the geometry seal 350 (making the protective case merely resistant to liquid damage, not waterproof). However, this concern may be remedied by utilizing a headphone seal plug 605, as shown if FIGS. 6 and 7. FIG. 6 displays a perspective view of a side of an exemplary protective case 100 for a mobile device 490, where the protective case 100 has headphone seal plug 605. The headphone seal plug 605 may be configured to be inserted into the headphone port opening 370 when a headphone plug is not inserted into the headphone port opening 370. The headphone seal plug 605 may form a waterproof seal with the geometry seal 350 when inserted into the headphone port opening 370, thereby retaining the beneficial waterproofing properties of the geometry seal 350 while still allowing access to the headphone port of the mobile device 490 when desired.

Figure 7:
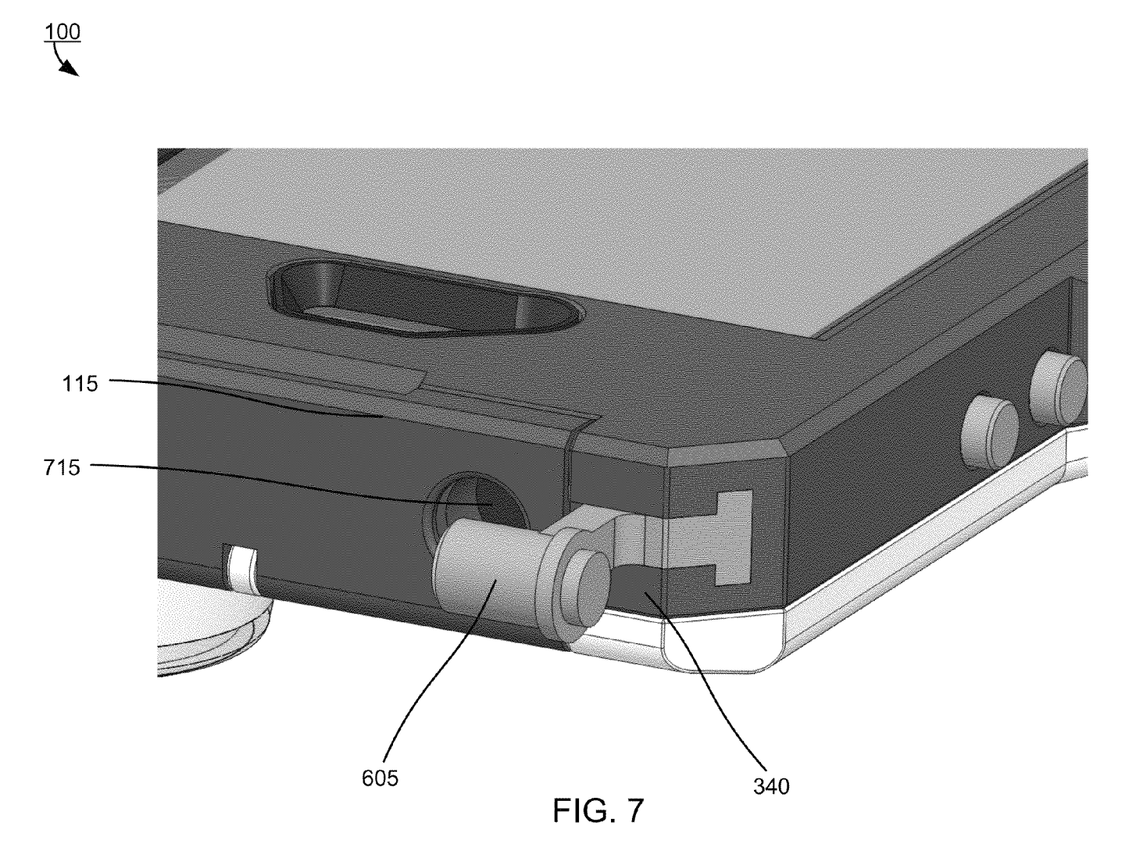
FIG. 7 displays a perspective view of a side of an exemplary protective case for a mobile device with a headphone seal plug removed.

FIG. 7 displays a perspective view of a side of an exemplary protective case 100 for a mobile device 490 with a headphone seal plug 605 removed. As shown in FIG. 7, a headphone plug may be inserted through an opening 715 in the sidewall into the mobile device, allowing use of headphones while the mobile device 490 is inside of the protective case 100. The opening 715 may be in the sidewall, or alternatively may be in the sidewall and in a latch 115, as shown in FIG. 7. As shown in FIG. 7, the headphone seal plug 605 may be coupled to the sidewall section 340 in some embodiments, to avoid the inadvertent loss of the headphone seal plug 605.

In an exemplary embodiment, specialized headphones may be provided to engage with the headphone port opening 370 and the opening 715 in the sidewall to preserve the waterproofing benefits of the geometry seal 350 while still permitting use of headphones. Such specialized headphones would have a headphone plug lined with a material that would form a headphone port waterproof seal, for example, or may use the latch 115 to hold the headphone plug in place. An alternative implementation of a headphone port waterproof seal may be provided by use of a headphone plug adapter. The headphone plug adapter may be configured to interface with the headphone port opening 370 and the opening 715 in the sidewall to form a headphone port waterproof seal that allows use of any set of headphones compatible with the headphone plug adapter.

Figure 8:
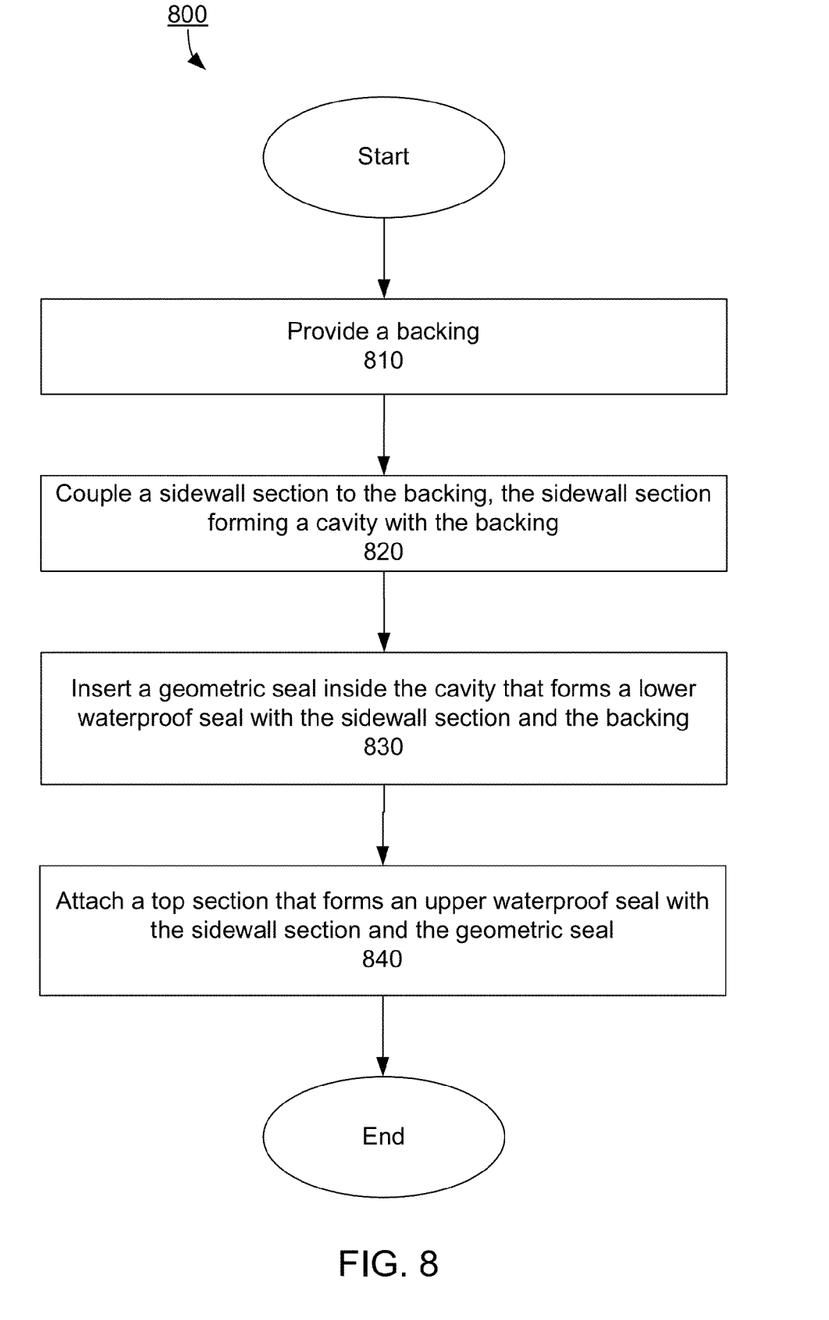
FIG. 8 displays a flowchart of an exemplary method for providing a protective case for a mobile device.

FIG. 8 displays a flowchart of an exemplary method 800 for providing a protective case 100 for a mobile device 490 as described above.

A backing 110 is provided at step 810. A sidewall section 340 having four sides is coupled to the backing 110 at step 820. The sidewall section 340 may be configured to form a cavity 380 with the backing 110 when attached to the backing 110.

A geometry seal 350 is inserted inside of the cavity 380 at step 830. The geometry seal 350 is configured to form a lower waterproof seal 595 with the sidewall section 340 and the backing 110. At step 840, a top section 220 is attached. The top section 220 may form an upper waterproof seal 585 with the sidewall section 340 and the geometry seal 350.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A protective case for a mobile device comprising:
   a backing with at least two backing grooves on a face of the backing, each backing groove receiving one of at least two protrusions of a waterproof seal, the at least two protrusions being parallel to each other;
   a contiguous, one-piece sidewall section comprising four external sides, the contiguous, one-piece sidewall attached to the backing via a hinge;
   a cavity defined by the contiguous, one-piece sidewall section and the backing;
   a four-sided, rectangular waterproof seal, the waterproof seal encircling a perimeter of the cavity, the waterproof seal comprising the at least two protrusions; and
   the waterproof seal sealing the cavity, the sealing comprising preventing a liquid from entering the cavity when compression is applied to the waterproof seal, the compression being caused by insertion of the mobile device into the cavity.

2. The protective case of claim 1, in which the waterproof seal further comprises one or more protrusions into the cavity that provide shock protection for the mobile device.

3. The protective case of claim 2, further including a transparent cover accessible to a touch screen of the mobile device.

4. The protective case of claim 1, in which the sidewall section comprises one or more openings, the waterproof seal being exposed through the openings such that one or more buttons on the mobile device may be pressed through the one or more openings via contact with the waterproof seal.

5. The protective case of claim 4, in which the waterproof seal further comprises a headphone port opening, allowing a headphone plug to be inserted through an opening in the sidewall into the mobile device.

6. The protective case of claim 5, further comprising a headphone seal plug insertable into the headphone port opening, the headphone seal plug forming a waterproof seal when inserted into the headphone port opening.

7. The protective case of claim 3, in which the transparent cover is integrated into a top section.

8. The protective case of claim 3, in which the transparent cover is a separate element affixed to a top section.

9. The protective case of claim 1, in which the protective case is waterproof for greater than two meters depth.

10. The protective case of claim 1, in which the waterproof seal is an h-seal.

11. A method for making a protective case for a mobile device comprising:
   providing a backing with at least two backing grooves on a face of the backing, each backing groove receiving one of at least two protrusions of a waterproof seal, the at least two protrusions being parallel to each other;
   providing a contiguous, one-piece sidewall section comprising four external sides, the contiguous, one-piece sidewall section attached to the backing via a hinge;
   providing a cavity defined by the contiguous, one-piece sidewall section and the backing;
   providing a four-sided, rectangular waterproof seal, the waterproof seal encircling a perimeter of the cavity, the waterproof seal comprising the at least two protrusions; and
   sealing of the cavity by the waterproof seal, the sealing comprising preventing a liquid from entering the cavity when compression is applied to the waterproof seal, the compression being caused by insertion of the mobile device into the cavity.

12. The method for making a protective case of claim 11, further comprising providing shock protection for the mobile device using one or more protrusions into the cavity attached to the waterproof seal.

13. The method for making a protective case of claim 11, in which the protective case comprises a transparent cover permit access accessible to a touch screen of the mobile device.

14. The method for making a protective case of claim 11, in which the sidewall section comprises one or more openings, further comprising situating the waterproof seal so that the waterproof seal is exposed through the openings such that one or more buttons on the mobile device may be pressed through the one or more openings via contact with the waterproof seal.

15. The method for making a protective case of claim 14, in which the waterproof seal further comprises an headphone port opening, allowing a headphone plug to be inserted through an opening in the sidewall into the mobile device.

16. The method for making a protective case of claim 15, further comprising inserting a headphone seal plug into the headphone port opening, forming a waterproof seal.

17. The method for making a protective case of claim 13, further comprising integrating the transparent cover into a top section.

18. The method for making a protective case of claim 13, in which the transparent cover is a separate element affixed to a top section.

19. The method for making a protective case of claim 11, in which the protective case is waterproof for greater than two meters depth.

20. The method for making a protective case of claim 11, in which the geometry seal is an h-seal.

* * * * *